US006881290B2

(12) United States Patent
Unglert et al.

(10) Patent No.: US 6,881,290 B2
(45) Date of Patent: Apr. 19, 2005

(54) PROCESS AND DEVICE FOR THE PRODUCTION OF LABELS AND LABEL OBTAINABLE BY THIS PROCESS

(75) Inventors: Robert Unglert, Munich (DE); Peter Seidl, Munich (DE); Gunter Krebs, Karlsfeld (DE)

(73) Assignee: Schreiner GmbH Co. KB, Oberschleissheim (DE)

( * ) Notice: Subject to any disclaimer, the term of this patent is extended or adjusted under 35 U.S.C. 154(b) by 53 days.

(21) Appl. No.: 10/195,308

(22) Filed: Jul. 16, 2002

(65) Prior Publication Data

US 2003/0025323 A1 Feb. 6, 2003

(30) Foreign Application Priority Data

Jul. 18, 2001 (DE) ........................................ 101 34 867

(51) Int. Cl.$^{7}$ ............................ B32B 31/00; G09F 3/02

(52) U.S. Cl. ....................... 156/204; 156/201; 156/227; 156/265; 156/270; 156/299; 156/300; 156/301; 156/302; 156/461; 156/464; 156/54; 156/519; 156/520; 283/81; 283/101; 40/672; 40/675

(58) Field of Search ................................ 156/227, 204, 156/201, 252, 514, 265, 461, 270, 297, 299, 300, 301, 302, 464, 522, 519, 520, 521, 512, 560; 283/101, 98, 106, 81, 94; 40/312, 672, 675

(56) References Cited

U.S. PATENT DOCUMENTS 5,766,716 A 6/1998 Barry
2003/0234073 A1 * 12/2003 Franko, Sr. ................. 156/204

FOREIGN PATENT DOCUMENTS

| | | | |
|---|---|---|---|
| EP | 0 232 054 | B1 | 12/1989 |
| EP | 0 839 365 | B1 | 5/2000 |
| EP | 1 085 486 | A2 | 3/2001 |
| WO | WO 92/04704 | | 3/1992 |
| WO | WO 97/04433 | | 2/1997 |

OTHER PUBLICATIONS

European Search Report dated Jan. 13, 2004.

* cited by examiner

*Primary Examiner*—Linda Gray
(74) *Attorney, Agent, or Firm*—Nixon Peabody LLP; Donald R. Studebaker

(57) ABSTRACT

The printed web of paper, from which label booklets are formed, is provided in a punching unit with punch cuts, which form at least one row of punched areas and non-punched areas, wherein the punched areas remain joined to the non-punched areas respectively along a line running in the transverse direction of the web of paper. In the folding unit each punched area is deflected out of the plane of the web of paper by a blast of compressed air, is folded over contrary to the running direction by means of a pressure roller and pressed onto the associated non-punched area. In the laminating unit a transparent web of plastic provided with a self-adhesive coating on its underside is laminated over the folded web of paper and pressed so that a multi-layered web is formed, which on its underside lies on a support web, which is provided with an anti-adhesive coating on its side facing the web of paper. In the punching-out unit the labels are punched out of the multilayered web, the support web with the anti-adhesive coating remaining intact.

41 Claims, 4 Drawing Sheets

PROCESS AND DEVICE FOR THE PRODUCTION OF LABELS AND LABEL OBTAINABLE BY THIS PROCESS

BACKGROUND OF THE INVENTION

The present invention relates to a process and a device for the production of labels as well as a label obtainable by this process.

Products packed in glass or plastic containers are frequently identified by labels adhered to the packaging. However, in the pharmaceutical field in particular, because of the generally small pack sizes the surface of the package is often insufficient to accommodate the wealth of information necessary for adequate product identification on a single-layer adhered label. Therefore, so-called booklet labels are widely used nowadays. These are labels with a multilayered structure comprising a booklet, i.e. a small book of several pages or a single- or multiple-folded sheet. Whereas the area of the booklet is limited by the surface available for labelling, e.g. the casing surface of a cylindrical or prismatic box or bottle, the surface on which information may be printed can be increased many times by a larger number of booklet pages. To protect the booklet, which is generally made of paper, against damage and soiling, it is generally covered with a transparent plastic foil.

Such a label as well as a process for its production is disclosed in EP 0 232 054 B1. The label comprises a support piece which is self-adhesive on its underside and a single- or multiple-folded sheet which is fastened to the upper side of the support piece by means of a transparent self-adhesive foil.

For production of the labels the folded small sheets are provided in the form of a stack and placed on the upper side of a support web which has a self-adhesive coating on its underside and is provided with tear-off material. The support web together with the small sheets is then coated with self-adhesive laminate on the underside. The laminate is also provided in the form of a web in this case and is pressed on by means of a pressure roller. The individual labels are punched out by means of a punching roller, the punch cuts separating the laminate and the support web while leaving the tear-off material intact, so that after the lattice formed between the labels is torn off, there is a web of tear-off material in place on which the labels are disposed. The process is performed continuously by unwinding the support web from a roll and directing it over a production line, along which said production steps occur.

However, such a production process is associated with certain problems. The small sheets must be produced separately and provided in the form of a stack which is expensive. There is also the risk here, amongst other things, of waste being generated as a result of incorrect or wrongly oriented small sheets being included in the stack. Moreover, the devices necessary for placement of the small sheets onto the support web are complicated, which results in increased expense of the process. Thus, it has been proposed, for example, to take up the small sheet from the stack using arms provided with a vacuum suction mechanism and place them on the support web. One particular difficulty is to position the folded small sheets exactly on the web and prevent the small sheets from slipping during or before lamination. Expensive measures to overcome this difficulty are tried, for instance using small sheets which have a pressure-sensitive adhesive on their underside and are pressed onto the web on placement, or applying small quantities of adhesive onto the upper side of the support web before applying the small sheets. The consequence of this is a further increase in expense of the process or of the devices necessary for this, while the possibility of labels being wrongly aligned on the web still cannot be fully excluded.

A further label of the above-described type as well as a process for its production is disclosed in EP 0 839 365 B1. The label has a folded small sheet or bound booklet, which is fastened on the upper side of a base made of tear-off material by means of a self-adhesive laminate. Further small sheets can be inserted into the folded small sheet. Moreover, a support piece which is self-adhesive on its underside can be provided, to which the small sheet is attached by means of the laminate.

For production of the labels, folded sheets are placed individually onto a web of tear-off material or support pieces which are self-adhesive on their underside already located thereon. A self-adhesive web of foil is laminated onto this and labels of the above-described type are punched out.

While it is possible to use sheets of a width which allows several small label sheets disposed in a row next to one another on the tear-off material to be cut out of a single sheet after lamination, the fundamental technical problem still remains that individual sheets have to be placed as exactly as possible on a web, which frequently does not occur with adequate precision at a feasible technical expense.

Moreover, there is the problem of checking the printed inscription which in the case of label booklets is generally distributed over all pages. Copies containing errors can often not be detected, since in the placement of already pre-folded small sheets the print of the pages lying on the inside is excluded from a simple check.

SUMMARY OF THE INVENTION

Aspects of the present invention seek to provide a process for the production of booklet labels, which avoids the above-mentioned problems and thus permits inexpensive and reliable label production. In addition, the present invention seeks to provide a suitable device for conducting this process. Moreover, a label obtainable from this process should also be provided which has the advantages of known booklet labels, while also being distinguished by a low production cost in the case of more than four printable surfaces.

According to one aspect of the invention, there is provided a production process for labels, which has the following steps. A flat first web of material, preferably made of paper, is provided with punch cuts, which form at least one row alternately of punched areas and non-punched areas running in the longitudinal direction of the first web of material, wherein the punched areas remain joined to the non-punched areas respectively along a line running in the transverse direction of the first web of material. The punched areas are folded over so that each punched area at least partially lies on a non-punched area and forms a folded piece of material with this. A continuous or interrupted top label layer, which is provided with an at least partially self-adhesive coating on one side, is applied onto the first web of material so that the side of the top label layer with the self-adhesive coating lies at least partially on the first web of material and forms a multilayered web with this. The labels are punched out of the multilayered web so that each label has a folded piece of material or booklet as well as a fastening strip with a self-adhesive coating formed from the top label layer and projecting beyond the folded piece of material on at least one side.

The problem of having to place pre-produced individually provided small sheets or booklets, which possibly have individual errors or are wrongly aligned, is removed, since all the label booklets can be made from a single web of material and remain joined to this up to the step of the finished labels being punched out.

Since label booklets printed with numerical, text or pictorial information are generally to be produced, the first web of material is preferably printed on one or both sides or is already printed on prior to the provision of punch cuts. Thus, it is possible for the process according to the invention to visually check the entire print of the booklets in a simple manner, since none of the future booklet pages is concealed prior to the folding process. Checking can be conducted via cameras arranged above or below the printed first web of material.

In a preferred embodiment, the top label layer is composed of a continuous, flat, preferably transparent, second web of material, which expediently has approximately the same width as the first web of material and is laminated. The second web of material may also be printed on. It is generally expedient if it is opaque in this case, but is it also conceivable with a completely or partially transparent configuration of the top label layer that the content of the print on the top label layer is completed by the printed inscription of the top booklet page visible through it.

In another preferred embodiment, the top label layer comprises discrete top labels, which are dispensed via the folded pieces of material so that they respectively project beyond the pieces of material in front of and behind these in the longitudinal direction. Thus, the top labels or parts thereof form the respective fastening strips of the labels after these are punched out. This embodiment provides the advantage of a low material expense for the top label layer, since no or only a little material is applied between the labels to be formed, which would then have to be removed again, the top labels can be placed precisely as indexed. They can be transparent, so that the respective uppermost booklet pages are visible or legible through them, or they are opaque and have print on the upper side. In the latter case, it has proved advantageous if the top labels are provided with only a partially self-adhesive coating so that they are adhered to the folded pieces of material respectively only close to the folding lines. Therefore, in the application of the labels the uppermost booklet page is easily exposed by partial detachment of the fastening strip from the base. A printed inscription can also be applied to the part of the underside of each top label without the self-adhesive coating, so that the fastening strip of each finished label can offer two additional information surfaces besides the pages of the respective booklet.

Before being dispensed, the top labels are preferably already provided on a web with an anti-adhesive coating. Alternatively, the top labels can be initially punched out of a continuous flat web with an at least partially self-adhesive coating on its underside before being dispensed. Since the top labels can be more closely spaced here than the finished labels, there is thus a material saving in relation to the continuous lamination of the web with the self-adhesive coating on the first web of material.

A support web is preferably applied onto the side of the first web of material remote from the top label layer. According to a particularly preferred embodiment, this is provided with an anti-adhesive coating on the side facing the first web of material.

According to a further advantageous development, the support web is provided with a self-adhesive coating on the side remote from the first web of material and is covered with tear-off material. This embodiment of the process according to the invention also allows conventional booklet labels with a support piece to be produced without having to cope with the disadvantages of known processes.

Advantageously, the punched areas are slightly longer than the non-punched areas in order to prevent the side of the folded piece of material located at the bottom from sticking to the fastening strip. For this, it is sufficient that the punched areas are only a little longer that the non-punched areas, however, the former can also clearly project above the latter.

According to a particularly preferred embodiment of the present invention, the folding process is achieved in two constituent steps. Firstly, the respective punched area is deflected out of the plane of the first web of material. This preferably occurs by means of a blast of compressed air, by means of electrostatic interactions or by means of an eccentric member. The respective punched area is then folded over by means of a roller or other suitable means and pressed onto the associated non-punched area, so that the line running in the transverse direction of the first web of material, via which the respective punched area remains joined to the associated non-punched area, is made into the folding line.

According to a further particularly preferred embodiment, the respective punched areas essentially have the shape of a rectangle, preferably with at least two rounded corners. In this case, three sides of the rectangle are formed by punched lines. The fourth side of the rectangle constitutes the line running in the transverse direction of the first web of material, via which the respective punched area remains joined to the respective non-punched area.

According to an advantageous development of the invention, during folding each punched area is provided with several folding lines running in the transverse direction of the first web of material. This also enables labels with more than four booklet pages to be produced.

According to a particularly advantageous development of the invention, several rows alternately of punched areas and non-punched areas lying parallel next to one another are formed on the first web of material, and after the punched areas are folded over and before the top label layer is applied, said first web of material is provided with at least one longitudinal fold so that several of the folded pieces of material respectively lie at least partially one on top of the other. In this case, the rows alternately of punched areas and non-punched areas are preferably displaced in relation to one another in the longitudinal direction of the first web of material in such a manner that when the top label layer is applied, each of the folded pieces of material partially lying one above the other comes into contact with the side of the top label layer with the self-adhesive coating. This also enables labels with more than four booklet pages to be produced, since each row alternately of punched areas and non-punched areas respectively contributes at least four booklet pages to the resulting booklet labels.

According to a particularly preferred embodiment of the invention, the process is performed continuously, in which case the first web of material is preferably guided stepwise in the longitudinal direction, and the punch cuts are oriented such that in the running direction the punched areas respectively lie in front of the associated non-punched areas and the first web of material preferably has edge perforations for exact guidance. In this case, the leading edge of each folded piece of material is preferably a folding line, and as a result the labels may be dispensed by machine from the support web onto containers or similar in a particularly favourable manner.

According to a further aspect of the invention, a device is provided for the production of labels, which has the following function units: a punching unit for providing a flat first web of material with punch cuts, which form at least one row alternately of punched areas and non-punched areas running in the longitudinal direction of the first web of material, wherein the punched areas remain joined to the non-punched areas respectively along a line running in the transverse direction of the first web of material, a folding unit for folding over the punched areas so that each punched area at least partially lies on a non-punched area and forms a folded piece of material with this, a laminating unit for the application of a continuous or interrupted top label layer, which is provided with a self-adhesive coating on one side, onto the first web of material so that the side of the top label layer with the self-adhesive coating lies at least partially on the first web of material and forms a multilayered web with this, and a punching unit for punching the labels out of the multilayered web so that each label has at least one folded piece of material as well as a fastening strip with a self-adhesive coating formed from the top label layer and projecting beyond the folded piece of material on at least one side.

According to a preferred embodiment, the laminating unit is suitable for laminating over a continuous flat second web of material.

According to another preferred embodiment, the laminating unit comprises a dispensing unit for dispensing discrete top labels, which form the top label layer. According to an advantageous development, moreover, a punching unit for initially punching the top labels out of a continuous flat second web of material is provided.

In addition, the device preferably has a printing unit for printing on the first web of material on one or both sides. Advantageously, a means for conducting a visual check of the print of the booklet pages produced from the first web of material before punching can be provided. Conventional cameras as well as electronic image processing systems may be used for this.

According to a particularly preferred development, the folding unit has the following: deflection means for deflecting each punched area out of the plane of the first web of material, folding means for folding over each punched area and a roller for pressing each punched area onto the associated non-punched area, so that the line running in the transverse direction of the first web of material, via which the respective punched area remains joined to the associated non-punched area, is made into the folding line.

The deflection means preferably have either at least one compressed air outlet for the periodic application of blasts of compressed air, which cause the deflection by blowing onto the punched areas, or at least one statically chargeable element, which causes the deflection by attraction and repulsion electrostatic interactions with the punched areas, or an eccentric member or cam, which causes the deflection by mechanically lifting the punched areas.

In a particularly advantageous development, the punching unit is configured for the formation of several rows alternately of punched area and non-punched areas, and the folding unit has means for providing the first web of material with at least one longitudinal fold located between the rows.

According to a particularly preferred embodiment, the device is designed for the continuous mode of operation and preferably has guide means, which preferably have spur wheels, the spurs of which engage in edge perforations of the first web of material, which serve to feed the first web of material stepwise to the function units, wherein the running direction of the first web of material is the same as the longitudinal direction of the first web of material. The spur wheels can also serve to guide further layers such as the support web, for instance, so long as these are provided with edge perforations, as a result of which an exact positioning of the individual layers in relation to one another is assured.

According to a further aspect of the present invention, a label for adhering to a base is provided, which has at least one first web of material, preferably made of paper, folded along at least one folding line as well as a fastening strip, preferably made of plastic, which has an at least partially self-adhesive coating on one side, lies with its underside with self-adhesive coating on at least one part of the upper side of the first piece of material and projects beyond the first piece of material on two sides, the underside of said fastening strip partially having direct contact to the base in the adhered state and holding the label by adhesive action on the base. Further, between the first piece of material and the fastening strip there are at least two adhesive-free surfaces, which can be made accessible by detaching a connection on the part of the fastening strip projecting beyond the first piece of material on the side opposite the folding line. The connection is preferably a perforation line or the adhesive connection of the part of the fastening strip projecting beyond the first piece of material on the side opposite the folding line with the base. The fastening strip projects to two sides and the first piece of material projects to one side beyond the adhesive-free surfaces.

Such a label can be produced simply, reliably and inexpensively with the production process according to the invention.

The folded piece of material is preferably printed on at least on one side with numerical, pictorial and/or text information.

According to a preferred embodiment of the invention, one of the adhesive-free surfaces provided between the first piece of material and the fastening strip is formed by a region of the underside of the fastening strip not provided with self-adhesive coating. If the fastening strip is opaque, then additional information surfaces may be formed by printing on its upper side and also the region of its underside not provided with self-adhesive coating, but a fastening strip which is printed upon on one side or without print is also possible.

According to a particularly preferred development of the invention, at least one of the adhesive-free surfaces provided between the first piece of material and the fastening strip is a surface of a second piece of material, which is preferably also folded, disposed between the first piece of material and the fastening strip. This may be either fully or only partially adhered to the fastening strip at its upper side.

If the fastening strip is advantageously at least partially transparent, then the upper side of the first or second piece of material disposed directly below it is visible through this.

To be able to accommodate as much printed information on the label as possible with the lowest possible material expenditure, all the adhesive-free surfaces provided between the first piece of material and the fastening strip are preferably printed on.

According to a further particularly preferred development, the label is configured for labelling the casing surface of a cylindrical or prismatic container and is preferably dimensioned in the manner of a wraparound label such that when adhered the fastening strip projecting over the first piece of material on two sides at least partially overlaps itself When adhered, the part of the fastening strip located at the bottom upon overlapping is preferably provided with an anti-adhesive layer on its upper side, so that it may be easily detached on one side in order to open the booklet comprising the first piece of material and possibly further pieces of material. When adhered, a detachable printed docket section is advantageously formed on the part of the fastening strip located at the top upon overlapping.

BRIEF DESCRIPTION OF THE DRAWINGS

Examples of preferred embodiments of the present invention are explained in more detail on the basis of the associated drawings.

DESCRIPTION OF THE PREFERRED EMBODIMENTS

Figure 1:
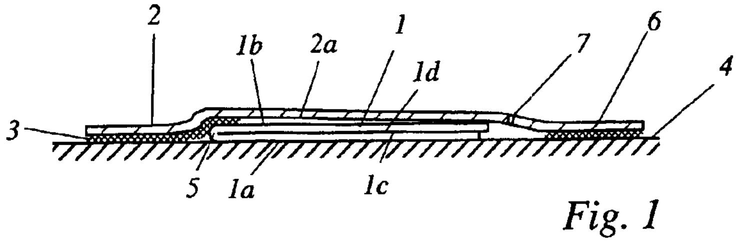
FIG. 1 in this case shows the layer structure of a label according to the invention with a folded piece of material in a schematic sectional representation. The representation is not to scale, in particular the layer thicknesses are drawn greatly enlarged for purposes of clarity. A cutout section of the base, which is not a part of label, is also shown.

Referring to the drawings, the label shown in FIG. 1 is composed of a folded piece of paper 1 and a plastic fastening strip 2 provided with an adhesive layer 3 which projects over the piece of paper 1 in two directions and has direct contact with the base 4. The fastening strip 2 remains adhered to the base 4 as a result of the adhesion of the adhesive and thus holds the piece of paper 1 in its position. At the same time, the fastening strip 2 covers the piece of paper 1 and thus protects this from being destroyed or soiled. The piece of paper 1 lies directly on the base 4. An additional support piece of whatever type is not necessary.

As a result of the folding, the piece of paper 1 forms a booklet with four pages (two outer pages 1*a*, 1*b* lying on the base 4 or the underside of the fastening strip 2, and also two inside pages 1*c*, 1*d*). In the region 2*a* of the underside of the fastening strip 2, where this lies on the piece of paper 1, the adhesive layer 3 is interrupted to such an extent that the piece of paper 1 is only adhered to the fastening strip 2 on a narrow surface close to the fold 5. The remaining portion of the outer page 1*b* of the booklet as well as the region 2*a* of the fastening strip 2, where the adhesive layer 3 is interrupted, form adhesive-free surfaces. All four booklet pages have a respectively different printed inscription (not shown), which can contain pictorial, text and numerical information. To open the booklet, the part 6 of the base lying opposite the fold 5 and projecting over the piece of paper 1 can be formed to be reversibly detachable, for example by a locally corresponding structure of the adhesive layer 3, or a perforation 7 is provided, which allows the fastening strip 2 to be torn away. The fastening strip 2 is opaque and is printed on both on its upper side and in the region 2*a* of its underside, where the adhesive layer 3 is interrupted (printed inscription not shown). The last-mentioned region 2*a* is also visible when the strip is torn away at the perforation 7 and thus performs the function of an additional booklet page.

Figure 2:
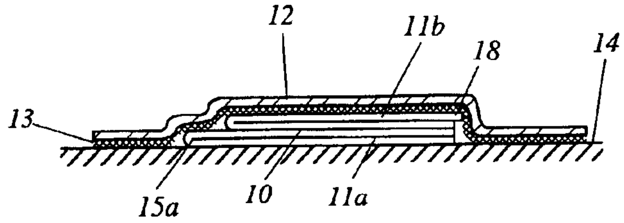
FIG. 2 shows the layer structure of a label according to the invention with two folded pieces of material arranged one on top of the other in schematic sectional representation, wherein the upper piece of material offers three adhesive-free surfaces between the lower piece of material and the fastening strip. The representation is again not to scale, in particular the layer thicknesses are drawn greatly enlarged for purposes of clarity. A cut-out section of the base, which is not a part of label, is also shown.

The label shown in FIG. 2 has two printed, folded pieces of paper 11*a*, 11*b*. It has a transparent fastening strip 12, which is provided with an adhesive layer 13, has direct contact with the base 14, and holds the pieces of paper 11*a*, 11*b* in their position. Materials considered suitable for the fastening strip are polyester or acrylate, amongst others. However, the fastening strip 2 can also be made of other plastics suitable for the production of transparent foils. The pieces of paper 11*a*, 11*b* are arranged slightly displaced in relation to one another so that the piece of paper 11*a* located at the bottom in the vicinity of the fold 15*a* also adheres directly to the fastening strip 12 via the adhesive layer 13, whereas the piece of paper 11*b* located at the top is adhered over the full surface to the fastening strip 12 at its upper side.

The booklet 10 formed from the pieces of paper 11*a*, 11*b* has eight pages. The top outside page of the booklet 10 lying on the fastening strip 12 is legible through this. To open the booklet 10, the measures indicated in the description of the embodiment shown in FIG. 1 are once again possible. The top part 18 of the piece of paper 11*b* located at the top projects slightly in order to protect the inner booklet pages from adhering to the fastening strip 12.

Figure 3:
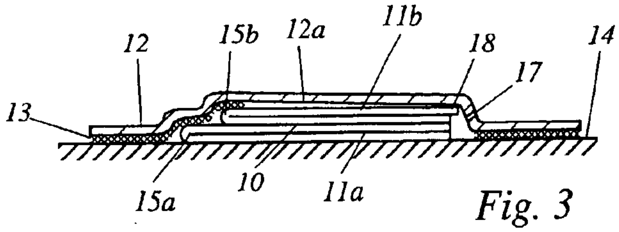
FIG. 3 shows the layer structure of a further label according to the invention likewise with two folded pieces of material arranged one on top of the other in schematic sectional representation, the upper piece of material here offering four adhesive-free surfaces. The representation is again not to scale, in particular the layer thicknesses are drawn greatly enlarged for purposes of clarity. A cut-out section of the base, which is not a part of label, is also shown.

The label shown in FIG. 3 essentially has the same constituent parts as the label shown in FIG. 2, wherein the fastening strip 12 is opaque. However, the upper side of the piece of paper 11*b* located at the top is only adhered to the fastening strip 12 in the vicinity of the fold 15*b*. In the rest of the region 12*a*, where the underside of the fastening strip lies on the piece of paper 11*b* located at the top, the adhesive layer 13 is interrupted. In this region 12*a*, the underside of the fastening strip is provided with a printed inscription (not shown), which is accessible after the perforation is torn open.

Figure 4:
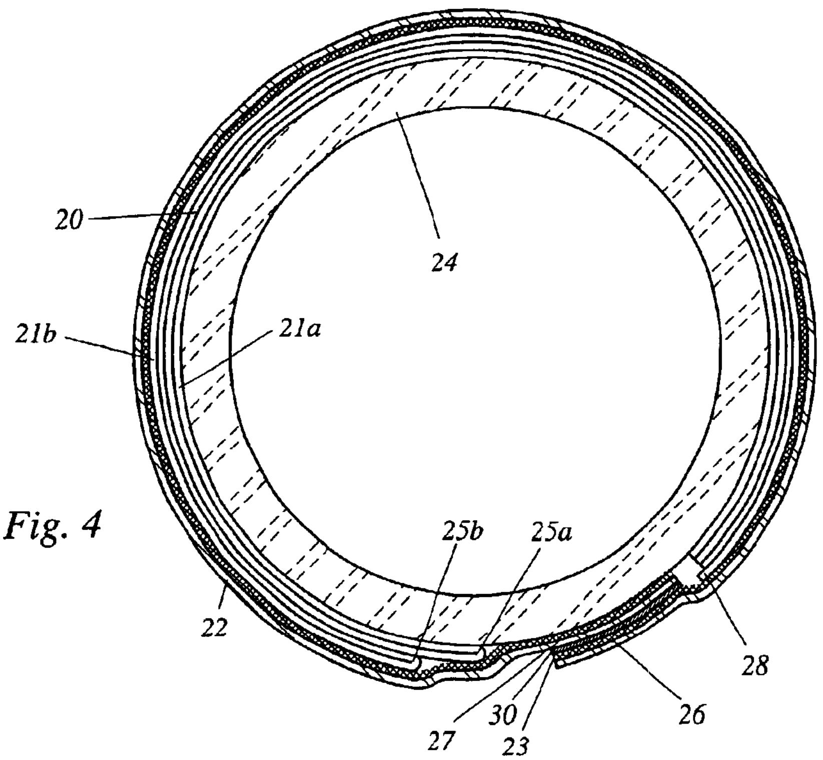
FIG. 4 shows the layer structure of a label according to the invention in a preferred wraparound configuration adhered onto a container in schematic sectional representation. The representation is again not to scale, in particular the layer thicknesses are drawn greatly enlarged for purposes of clarity.

The label adhered onto a container 24 shown in FIG. 4 is in the form of a wraparound label, i.e. one part 26 of the transparent fastening strip 22 projecting over the booklet 20 composed of two folded small sheets of paper 21*a*, 21*b* overlaps the other part 27 projecting over the booklet 20 on the side of the fold 25*a*, 25*b*. This part is provided with an anti-adhesive layer 30 on its upper side so that the fastening strip 22, which is coated with adhesive 23 on its underside, can be detached at this location in order to open the booklet 20. All eight pages of the booklet 20 are printed on. The top part 28 of the piece of paper 21*b* located at the top in turn protrudes slightly in order to protect the inner booklet pages from adhering to the fastening strip 22. The pieces of paper 21*a*, 21*b* are arranged slightly displaced in relation to one another so that the piece of paper 21*a* located at the bottom also adheres directly to the fastening strip 22 in the vicinity of the fold 25*a* via the adhesive layer 23.

The operation of an advantageously configured process according to the invention by means of an advantageously configured device according to the invention will now be explained on the basis of FIGS. 5*a*–7*b*. The directions of running and rotation of the web are indicated accordingly by arrows. The web of paper 100 printed on both sides, from which the label booklets are formed, is provided on a paper roll 101. The web of paper is provided with edge perforations 102 so that it can be precisely guided and transported by means of spur wheels 103*a*, 103*b*, 103*c*, the spurs of which engage into the edge perforations 102. The web of paper 100 is thus continuously fed stepwise, in the longitudinal direction of the punching unit 104, to the folding unit 105, the laminating unit 106 and the punching-out unit 107.

Figure 7A:
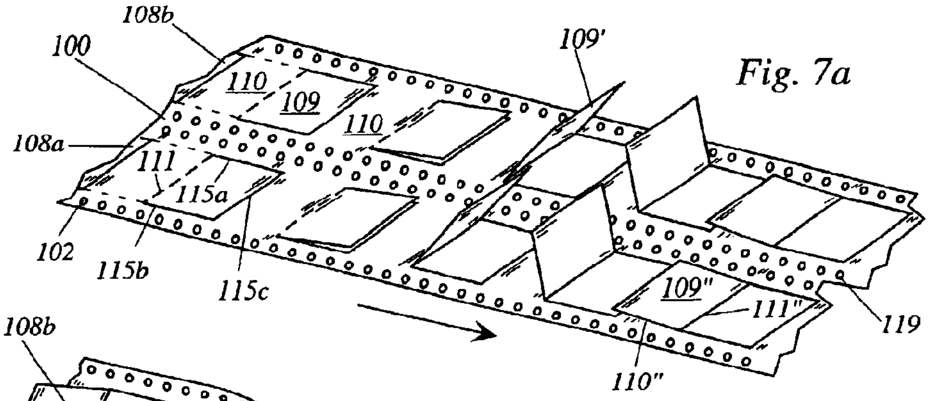
FIG. 7*a* schematically illustrates the folding operation as part of the process according to the invention, wherein several stages of the operation are shown on the basis of a cut-out section of a web of material.
Figure 7B:
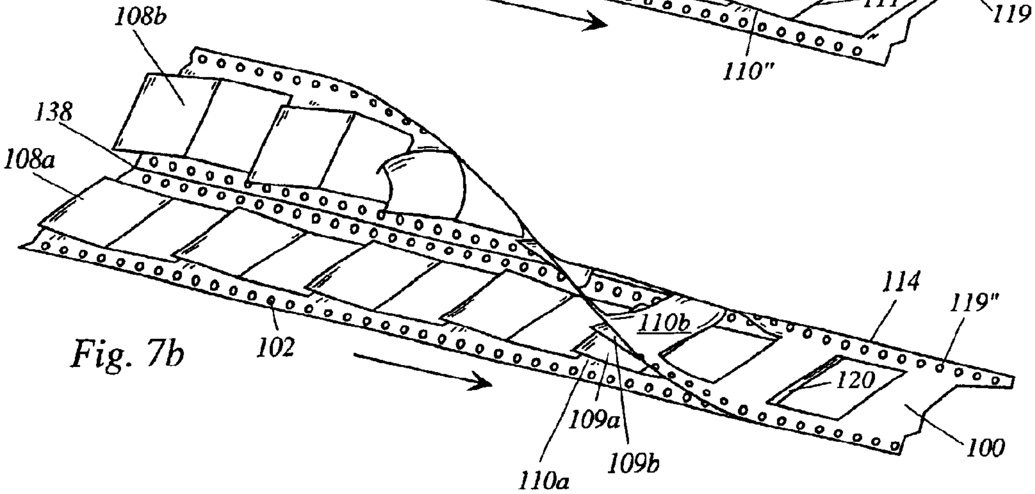
FIG. 7*b* schematically illustrates the cross folding of a web of material, which occurs during the production of labels according to the invention in the manner shown in FIG. 2.

In the punching unit 104, the web of paper 100 is provided with punch cuts or stampings, which form two parallel rows 108, 108*b* alternately of punched areas 109 and non-punched areas 110, wherein the punched areas 109 remain joined to the non-punched areas 110 respectively along a line 111, which runs in the transverse direction of the web of paper 100 and can be expediently perforated to facilitate the subsequent folding operation, as is illustrated on the left in FIG. 7*a*. Each punched area 109 has the shape of a rectangle, wherein three sides are formed by punched lines 115*a*, 115*b*, 115*c*, and the fourth side of the rectangle constitutes the line 111 running in the transverse direction of the web of paper, via which the respective punched area 109 remains joined to the respective non-punched area 110. The punched areas 109 are slightly longer than the non-punched areas 110. The rows 108*a*, 108*b* are slightly displaced in relation to one another in the longitudinal direction.

Figure 6:
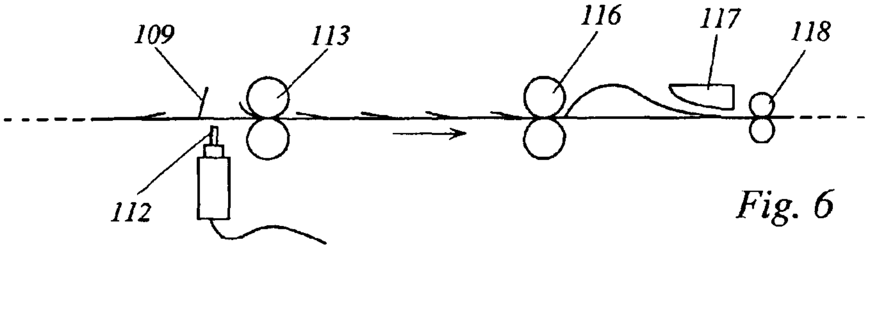
FIG. 6 schematically shows the folding unit of a device according to the invention in a preferred configuration.

In the folding unit 105, which is shown schematically in FIG. 6, each punched area 109 is deflected out of the plane of the web of paper 100 by a blast of compressed air from a compressed air nozzle 112. Punched areas are shown in the deflected position 109' in the centre of FIG. 7*a*. Each punched area 109 is then folded over contrary to the running direction by means of a pressure roller 113 and pressed onto the associated non-punched area 110. As a result of this, the line 111 running in the transverse direction of the web of paper 100, by means of which the respective punched area 109 remains joined to the associated non-punched area 110, is parallel to folding line 111". On the right in FIG. 7*a*, punched areas in the folded-over position 109" are shown folded back onto the associated non-punched areas 110".

Cross folding is then performed, so that two respective punched areas 109*a*, 109*b* come to lie on one another. This is shown schematically in FIG. 7*b*. According to the technology used here, a fold 114 running in the longitudinal direction is produced during a cross folding operation, whereas a fold running in the transverse direction would be produced during a longitudinal folding operation. The cross folding operation is performed by means of a cross folding roller 116, a guide means 117 and a pressure roller 118. The web of paper 100 is advantageously provided with central perforations 119 which become edge perforations 119" after the cross folding operation. Because of the slight displacement of the rows 108*a*, 108*b* relative to one another, a small surface 120 of one respective punched area 109*a* in the vicinity of the folding line 111" is not concealed.

In the explained embodiment of the process, labels with eight-page booklets in the manner of the label shown in FIG. 2 are produced, wherein front and reverse sides of the punched and non-punched areas 109*a*, 109*b*, 110*a*, 110*b* respectively form one booklet page. If conventional labels with four-page booklets or labels in the manner of the label shown in FIG. 1 are to be produced, then the step of cross folding is omitted.

In the laminating unit 106, a transparent web of plastic 121 provided with a self-adhesive coating on its underside is laminated over the folded web of paper 100 and in this case pressed by means of a pressure roller 128, so that a multilayered web 122 is formed. The unconcealed small surface 120 of one punched area 109*a* in the vicinity of the folding line 111" as well as the full surface of the respective non-punched region 110*b* belonging to the other row 108*b* come into direct contact with the side of the web of plastic 121 with the self-adhesive coating during lamination. The multilayered web 122 lies with its underside on a support web 123, which is provided with an anti-adhesive coating on its side facing the web of paper, has edge perforations with the same spacing as the edge perforations 102 of the web of paper 100 and is also fed into the laminating unit 106. Both the web of plastic 121 and the support web 123 are provided on rolls 124, 125, in which case on its side with the self-adhesive coating the web of plastic 121 is initially concealed by tear-off material 126, which is torn off prior to lamination and wound onto a waste roll 127.

Figure 5A:
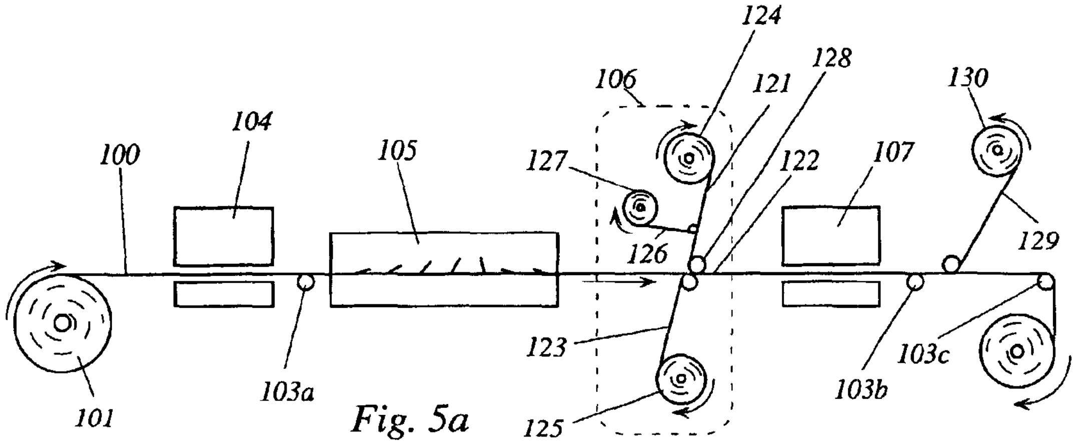
FIG. 5*a* schematically shows the essential elements of a device according to the invention for continuous operation of the process according to the invention with the application of a continuous top label layer.
Figure 5B:
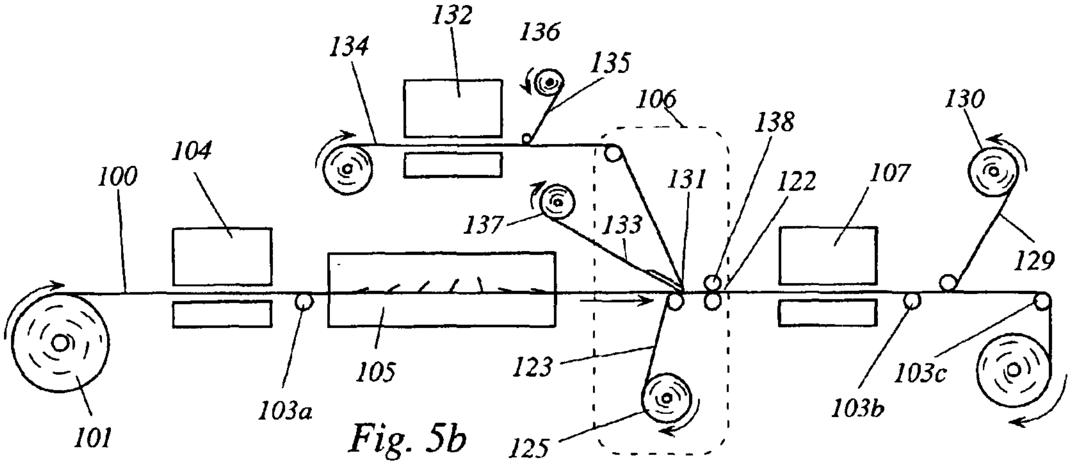
FIG. 5*b* schematically shows the essential elements of a device according to the invention for continuous operation of the process according to the invention with the application of an interrupted top label layer.

Alternatively, as in the variant shown in FIG. 5*b*, transparent top labels provided with a self-adhesive coating on their underside are dispensed onto the folded web of paper in the lamination unit 106 so that each booklet formed during the folding process is concealed by a top label. The dispensing can be achieved via a dispensing edge 131, as shown, however, alternatively the labels may also be dispensed precisely as indexed by other methods, for instance via a mobile arm. The top labels are pressed by means of rollers 138. The top labels are produced in an initial punching unit 132 by punching out a transparent web of plastic 134 with a self-adhesive coating on its underside lying on a web 133 with an anti-adhesive coating. The lattice 135 formed between the top labels by the initial punching process is pulled off and rolled onto a waste roll 136. The web 133 provided with an anti-adhesive coating is also rolled onto a waste roll 137 after dispensing. The unconcealed small surface 120 of one punched area 109*a* in the vicinity of the folding line 111" as well as the full surface of the respective non-punched area 110*b* belonging to the other row 108*b* come into direct contact with the side of the top label with the self-adhesive coating during dispensing. The multilayered web 122 lies with its underside on a support web 123, which is provided with an anti-adhesive coating on its side facing the web of paper 100, has edge perforations with the same spacing as the edge perforations 102 of the web of paper 100 and is also fed into the laminating unit 106. The support web 123 is provided on a roll 125.

In the punching unit 107 the labels are punched out of the multilayered web, in which case the support web 123 with the anti-adhesive coating remains intact. The lattice 129 formed between the labels by the punching out process is pulled off and rolled onto a waste roll 130. As explained above, each label is composed of a booklet 10 formed from the web of paper 100 as well as a fastening strip 12 projecting beyond the booklet 10 on two sides. The labels are disposed on the support web 123 with the anti-adhesive coating, from which they can be dispensed by machine onto containers or other bases. In this case, it has proved particularly expedient that the folding lines 111" lead so that the booklets 10 are opened without hindrance during dispensing.

Figure 8:
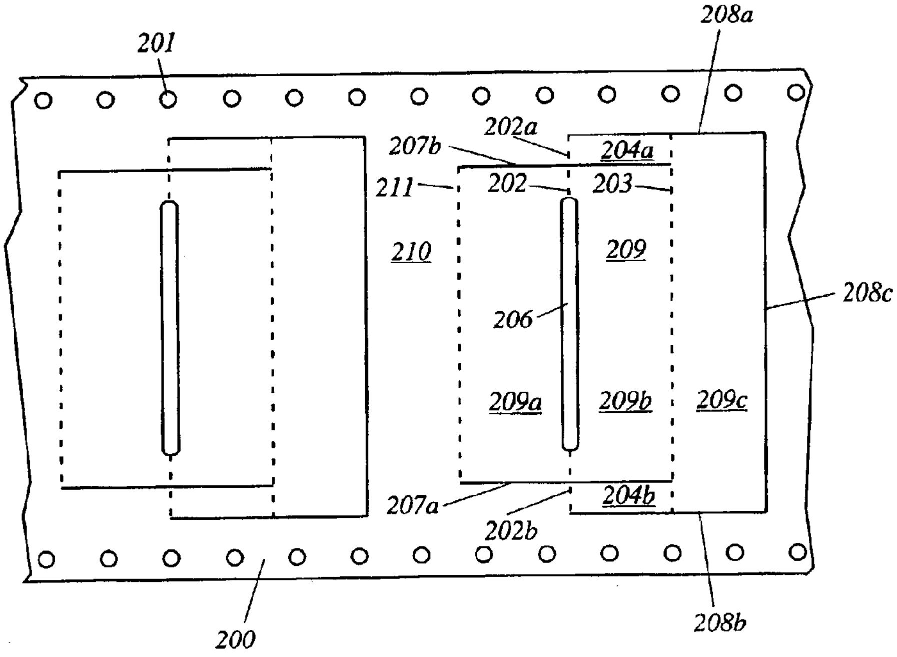
FIG. 8 is a two-dimensional top view onto the punching and folding pattern (not to scale) for the production of a piece of material folded multiple times in a concertina-like manner from a web of material shown in sections as part of the production of a booklet label according to the invention.
Figure 9:
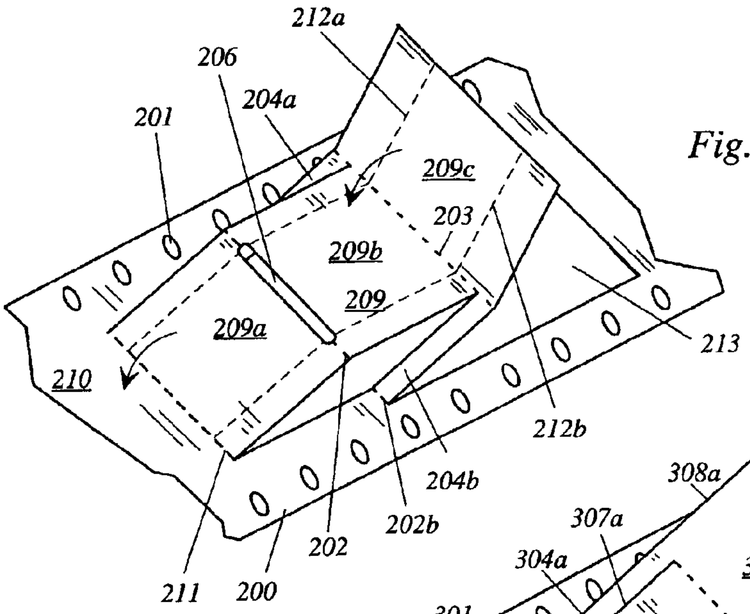
FIG. 9 schematically shows the folding operation in the case of a piece of material punched according to the pattern shown in FIG. 8 from a web of material shown in sections.

Labels with a booklet of more than four pages may also be produced using a process according to the invention if the punched areas 209, 309 are made many times longer than the non-punched areas 210, 310 and provided with one or more cross folds 202, 203, 302, 303. This is illustrated by means of FIGS. 8–11. FIG. 8 shows in a two-dimensional top view the punching and folding pattern (not to scale) for the production according to the invention of a multi-page label booklet from a web of material 200 with edge perforations 201 shown in sections. FIG. 9 schematically illustrates the folding process with a piece of material punched according to the pattern shown in FIG. 8 from the web of material 200 shown in sections.

The punched area 209 comprises three wings 209*a*, 209*b*, 209*c* to be formed during folding. The first and second wings 209*a* and 209*b*, as viewed from the folding line 211 running between the non-punched area 210 and the punched area 209, are joined to one another by means of cross fold 202, and the second and third 209*b* and 209*c*, as viewed from the folding line 211, are joined to one another by means of cross fold 203. The first wing 209*a* adjoining the non-punched area 210 is slightly longer (in the longitudinal direction of the web of material 200) than each of the other two wings 209*b*, 209*c*. The third wing 209*c* furthest removed from the non-punched area 210 is slightly wider (in the transverse direction of the web of material 200) than the other two wings 209*a*, 209*b*. The lateral regions of the third wing 209*c* projecting over the first and second wings 209*a*, 209*b* are joined to the rest of the web of material 200 by means of punched legs 204*a*, 204*b*. The legs 204*a*, 204*b* are linked to the third wing 209*c* by means of the elongated folding line 203 and to the rest of the web of material 200 by means of the folding lines 202*a*, 202*b*, they enable the three wings 209*a*, 209*b*, 209*c* of the punched portion 209 to be formed during folding to be deflected in a concertina-like manner without folding over jointly as a single wing. The folding lines 202*a*, 202*b* lie in continuation of the folding line 202 so long as the wings 209*a*, 209*b*, 209*c* are not deflected out of the plane of the web of material.

The punching pattern required for this construction is as follows: the two punched lines 207*a* and 207*b* constitute the lateral boundary of the middle wing 209*b* to the legs 204*a*, 204*b* running in the longitudinal direction as well as the lateral boundary of the first wing 209*a* to the rest of the web of material 200 running in the longitudinal direction. The punched lines 208*a* and 208*b* constitute the lateral boundary of the legs 204*a* and 204*b* running in the longitudinal direction as well as the third wing 209*c*. The punched line 208*c* running in the transverse direction defines the third wing 209*c* towards the side further removed from the middle wing 209*b* and joins punched lines 208*a* and 208*b* to one another. The folding line 202 is interrupted in its centre by a narrow fully punched out region 206.

After the concertina-like folding of the three wings 209*a*, 209*b*, 209*c* and the non-punched area 210, wherein the fully punched out region 206 facilitates the defined folding over along the folding line 202, a web with a self-adhesive coating on one side is laminated over and the label to be formed is punched out. In this case, the regions of the three wings 209*a*, 209*b*, 209*c* projecting over the fully punched out region 206 are cut off along the separating lines 212*a*, 212*b*. The front and reverse sides of the three wings 209*a*, 209*b*, 209*c* and of the region 210 form the eight pages of the label booklet. The edges of the fully punched out region 206 now form side edges of the label booklet on the open booklet page. Because the first wing 209*a* is slightly longer than the other two wings 209*b*, 209*c*, a narrow surface component of the first wing close to the folding line can be exposed so that it comes into contact with the self-adhesive coating upon the subsequent lamination of the top label layer with the self-adhesive coating. In the end, a label of the type shown in FIG. 2 is formed, wherein the first wing 209*a* together with the non-punched area 210 forms the piece of material 11*a* located at the bottom, and the second wing 209*b* together with the third wing 209*c* forms the piece of material 11*b* located at the top.

Figure 10A:
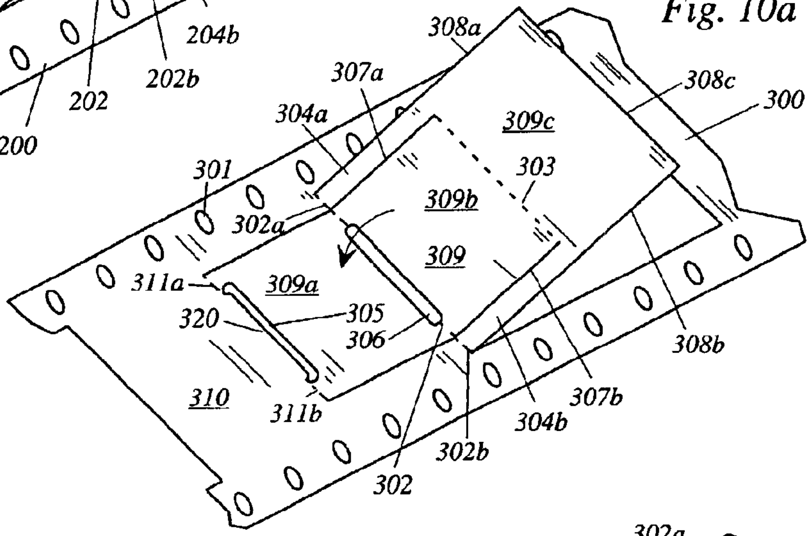
FIGS. 10*a* and 10*b* schematically illustrate the single fold made twice for the production of a multiple folded piece of material from a web of material shown in sections as part of the production of a booklet label according to the invention.
Figure 11:
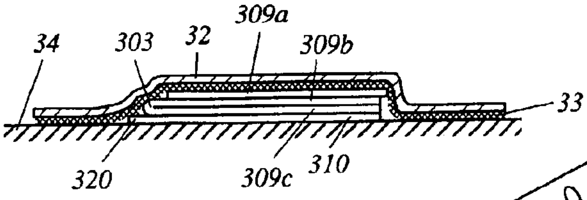
FIG. 11 schematically shows a label according to the invention obtained by means of folding in accordance with FIGS. 10*a,b*.
Figure 10B:
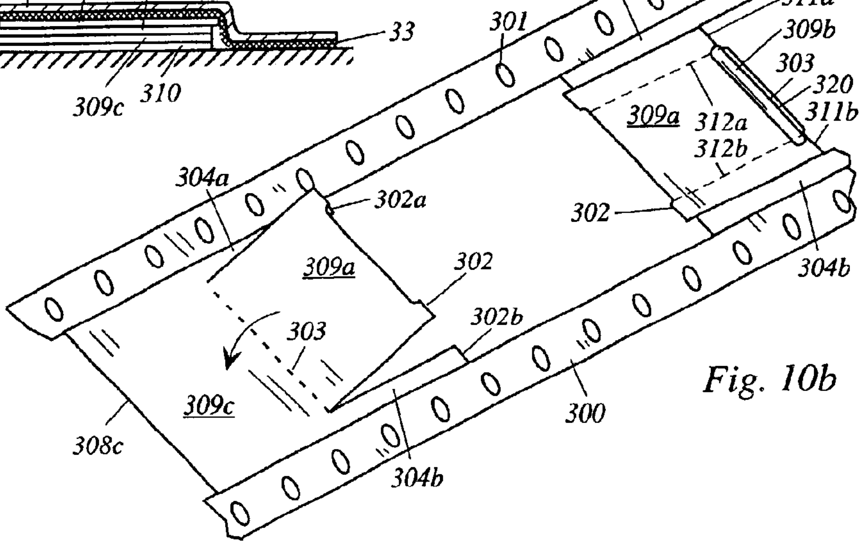

By bringing together two or three webs of material with pieces of material folded according to the above pattern in a sandwich-like arrangement so that the wings 209*a*, 209*b*, 209*c* of one web of material 200 folded onto the non-punched areas 210 respectively come to lie displaced relative to the corresponding regions of the other webs of material, i.e. in such a manner that the folded pieces of material of the other webs of material lie in the region 213 of the respective web of material exposed by folding over the wings 209*a*, 209*b*, 209*c*, it is possible to save a considerable amount of material when laminating a continuous top label layer. Whereas when using only one web of material 200 as well as one continuous web of laminate with self-adhesive coating forming the top label layer, the laminate encountering the region 213 exposed by folding over the wings 209*a*, 209*b*, 209*c* substantially becomes waste after the finished labels are punched out, the same laminate area in the previous sandwiching of two or three webs of material in the above-described manner is sufficient for twice or three times the number of labels. The two or three webs of material can be precisely guided in this case because of the presence of the edge perforations 201. FIGS. 10*a, b* show how the label according to the invention shown in FIG. 11 can be produced with a similar punching pattern to that in FIGS. 8–9 by means of a single fold made twice. FIG. 10*a* and FIG. 10*b* show three different stages of the folding which essentially comprises two single folding operations. In FIG. 10*a* a portion of the punched area 309 is deflected out of the plane of the web of material 300 with edge perforation 301, i.e. the first fold has begun. In the left-hand half of FIG. 10*b*, the first fold has already been concluded, and another portion of the punched area 309 is deflected out of the plane of the web of material 300, i.e. the second fold has begun. In the right-hand half of FIG. 10*b* the second fold has also been concluded, and the twice folded piece of material is ready to be laminated with the top label layer.

The punched area 309 comprises three wings 309*a*, 309*b*, 309*c* to be formed during folding. The first and second wings 309*a* and 309*b* as viewed from the non-punched area 310 are joined to one another by means of cross fold 302, and the second and third wings 309*b* and 309*c*, as viewed from the non-punched area 310, are joined to one another by means of cross fold 303. The third wing 309*c* furthest removed from the non-punched area 310 is slightly wider (in the transverse direction of the web of material 300) than the other two wings 309*a*, 309*b*. The lateral regions of the third wing 209*c* projecting over the first and second wings 309*a*, 309*b* are joined to the rest of the web of material 300 by means of punched legs 304*a*, 304*b*. The legs 304*a*, 304*b* next to the folding line 303 merge evenly into third wing 309*c* and are linked to the rest of the web of material 200 by means of the folding lines 302*a*, 302*b*. They ensure that in the first single folding operation only the second and third wing 309*b*, 309*c* are deflected, while the first wing 309*a* still remains in the plane of the web of material 300. The folding lines 302*a*, 302*b* lie in continuation of the folding line 302 so long as the second fold has not yet begun.

The two punched lines 307*a* and 307*b* constitute the lateral boundary of the middle wing 309*b* to the legs 304*a*, 304*b* running in the longitudinal direction as well as the lateral boundary of the first wing 309*a* to the rest of the web of material 300 running in the longitudinal direction. The punched lines 308*a* and 308*b* constitute the lateral boundary of the legs 304*a* and 304*b* running in the longitudinal direction as well as the third wing 309*c*. The punched line 308*c* running in the transverse direction defines the third wing 309*c* towards the side further removed from the middle wing 309*b* and joins punched lines 308*a* and 308*b* to one another. The folding line 302 is interrupted in its centre by a narrow fully punched out region 306. At the transition between the non-punched area 310 and the first wing 309*a*, an elongated punched out recess 305 is located, into which a tongue 320 projects as a continuation of the non-punched area 310, as well as folding lines 311*a*, 311*b* on both sides of the recess 305.

The first fold is performed along the folding line 302 and its continuation 302*a*, 302*b*. In this case the second wing 309*b* comes to lie on the first wing 309*a* and the third wing 310 comes to lie on the non-punched area 310. The second fold is performed along the folding lines 311*a*, 311*b*, 303, as a result of which the second wing 309*a* comes to lie on the third wing 309*c*.

After the second fold a small surface component of the second wing 309*b* close to the folding line 303 lies exposed under the punched out area 306, and the likewise exposed tongue 320 of the non-punched area 310 projects beyond the folding line 303. Therefore, during lamination of the top label layer these two exposed surfaces as well as the first wing 309*a* come into contact with the self-adhesive underside of the top label layer.

After the finished labels are punched out, wherein the regions of the three wings 309*a*, 309*b*, 309*c* projecting over the fully punched out region 306 are cut off along the separating lines 312*a*, 312*b*, the edges of the fully punched out region 306 now form side edges of the label booklet on the open booklet page. The finished label is outlined in FIG. 11. The fastening strip 32 formed from the top label layer holds the three wings 303*a*, 309*b*, 309*c* as well as the bottom booklet page formed from the non-punched area on the base 34 by means of the adhesive layer 33. The label booklet is thus composed of a folded piece of material, which comprises the second and third wing 309*b*, 309*c*, and two non-folded pieces of material, which are formed from the first wing 309 and the non-punched area 310.

It will be understood that the above description of the present invention is susceptible to various modifications, changes and adaptations.

What is claimed is:

1. Process for the production of labels, which has the following steps:

a) provision of punch cuts on a flat first web of material, said punch cuts forming at least one row alternately of punched areas and non-punched areas running in the longitudinal direction of the first web of material, wherein the punched areas remain joined to the non-punched areas respectively along a line running in the transverse direction of the first web of material, b) folding over of the punched areas so that each punched area at least partially lies on a non-punched area and forms a folded piece of material with this, c) application of a continuous or interrupted top label layer, which is provided with an at least partially self-adhesive coating on one side, onto the first web of material so that the side of the top label layer with the self-adhesive coating lies at least partially on the first web of material and forms a multilayered web with this, and d) punching the labels out of the multilayered web so that each label has at least one folded piece of material as well as a fastening strip with a self-adhesive coating, the fastening strip being formed from the top label layer and projecting beyond the folded piece of material on at least one side.

2. Process according to claim 1, wherein the top label layer is composed of a continuous, flat second web of material.

3. Process according to claim 1, wherein the application of the top label layer includes the dispensing of discrete top labels.

4. Process according to claim 3, wherein before dispensing, the top labels are present in initially punched form on a web with an anti-adhesive coating.

5. Process according to claim 3, wherein before dispensing, the top labels are initially punched out of a continuous flat second web of material, which lies on a web with an anti-adhesive coating.

6. Process according to claim 1, wherein the first web of material is printed upon on one or both sides before being provided with punch cuts.

7. Process according to claim 1, wherein the first web of material is made of paper.

8. Process according to claim 1, wherein the top label layer at least partially transparent.

9. Process according to claim 1, wherein a support web is applied onto the side of the first web of material remote from the top label layer.

10. Process according to claim 9, wherein the support web is provided with an anti-adhesive coating on the side facing the first web of material.

11. Process according to claim 9, wherein the support web is provided with a self-adhesive coating on the side remote from the first web of material.

12. Process according to claim 11, wherein the side of the support web with the self-adhesive coating is covered with tear-off material.

13. Process according to claim 1, wherein the punched areas are longer than the non-punched areas.

14. Process according to claim 1, wherein the step of folding over the punched areas comprises the following constituent steps:

i) deflecting each punched area out of the plane of the first web of material and ii) folding over and pressing each punched area onto the associated non-punched area, so that the line running in the transverse direction of the first web of material, by means of which the respective punched area remains joined to the associated non-punched area, is made into the folding line.

15. Process according to claim 14, wherein the folding over and pressing of each punched area is performed on the associated non-punched area by means of at least one roller.

16. Process according to claim 14, wherein the deflection of each punched area out of the plane of the first web of material is performed by means of a blast of compressed air.

17. Process according to claim 14, wherein the deflection of each punched area out of the plane of the first web of material is caused by means of electrostatic interactions.

18. Process according to claim 14, wherein the deflection of each punched area out of the plane of the first web of material is performed by means of an eccentric member.

19. Process according to claim 1, wherein the respective punched areas essentially have the shape of a rectangle, three sides of the rectangle being formed by punched lines and the fourth side of the rectangle constituting the line running in the transverse direction of the first web of material, by means of which the respective punched area remains joined to the respective non-punched area.

20. Process according to claim 19, wherein at least two corners of the rectangle are rounded off.

21. Process according to claim 1, wherein during folding over each punched area is provided with a plurality of folding lines running in the transverse direction of the first web of material.

22. Process according to claim 1, wherein the line running in the transverse direction of the first web of material, by means of which the respective punched area remains joined to the respective non-punched area, is provided with a perforation.

23. Process according to claim 1, wherein a plurality of rows alternately of punched areas and non-punched areas are formed, and after the punched areas are folded over and before the top label layer is applied, the first web of material is provided with at least one longitudinal fold so that a plurality of the folded pieces of material respectively lie at least partially one on top of the other.

24. Process according to claim 23, wherein the rows alternately of punched areas and non-punched areas are displaced in relation to one another in the longitudinal direction of the first web of material in such a manner that when the top label layer is applied, each of the folded pieces of material partially lying one above the other comes into contact with the side of the top label layer with the self-adhesive coating.

25. Process according to claim 1, wherein the process is performed continuously.

26. Process according to claim 25, wherein the first web of material is guided stepwise in the longitudinal direction, and the punch cuts are oriented such that in the running direction the punched areas respectively lie in front of the associated non-punched areas.

27. Process according to claim 26, characterised in that the first web of material has edge perforations for guidance of the first web of material.

28. Process according to claim 26, wherein the leading edge of each folded piece of material is a folding line.

29. Device for the production of labels, which has the following function units:

a) a punching unit for providing a flat first web of material with punch cuts, which form at least one row alternately of punched areas and non-punched areas running in the longitudinal direction of the first web of material, wherein the punched areas remain joined to the non-punched areas respectively along a line running in the transverse direction of the first web of material, b) a folding unit for folding over the punched areas so that each punched area at least partially lies on a non-punched area and forms a folded piece of material with this, c) a laminating unit for the application of a continuous or interrupted top label layer, which is provided with a self-adhesive coating on one side, onto the first web of material so that the side of the top label layer with the self-adhesive coating lies at least partially on the first web of material and forms a multilayered web with this, and d) a punching-out unit for punching the labels out of the multilayered web so that each label has at least one folded piece of material as well as a fastening strip with a self-adhesive coating, the fastening strip being formed from the top label layer and projecting beyond the folded piece of material on at least one side.

30. Device according to claim 29, wherein the laminating unit is configured for application of a continuous flat second web of material as a top label layer.

31. Device according to claim 29, wherein the laminating unit comprises a dispensing unit for dispensing discrete top labels, which form the interrupted top label layer.

32. Device according to claim 31, wherein the device has a punching unit for initially punching the top labels out of a continuous flat second web of material, which lies on a web with an anti-adhesive coating.

33. Device according to claim 29, wherein the device additionally has a printing unit for printing on the first web of material on one or both sides.

34. Device according to claim 29, wherein the folding unit has the following:

i) deflection means for deflecting each punched area out of the plane of the first web of material, ii) folding means for folding over each punched area and iii) a roller for pressing each punched area onto the associated non-punched area, so that the line running in the transverse direction of the first web of material, by means of which the respective punched area remains joined to the associated non-punched area, is made into the folding line.

35. Device according to claim 34, wherein the deflection means have at least one compressed air outlet for the periodic application of blasts of compressed air, which cause the deflection by blowing onto the punched areas.

36. Device according to claim 34, wherein the deflection means have at least one statically chargeable element, which causes the deflection by attraction or repulsion electrostatic interactions with the punched areas.

37. Device according to claim 34, wherein the deflection means have at least one eccentric member, which causes the deflection by mechanically lifting the punched areas.

38. Device according to claim 29, wherein the punching unit is configured for the formation of a plurality of rows alternately of punched areas and non-punched areas, and the folding unit has means for providing the first web of material with at least one longitudinal fold located between the rows.

39. Device according to claim 29, wherein the device is designed for the continuous mode of operation.

40. Device according to claim 39, wherein the device has guide means, which serve to feed the first web of material stepwise to the function units, and the running direction of the first web of material is the same as the longitudinal direction of the first web of material.

41. Device according to claim 40, wherein the guide means have spur wheels, the spurs of which engage in edge perforations of the first web of material.

* * * * *